July 1, 1947. H. E. KORUM 2,423,192
FEED HOPPER
Filed Sept. 14, 1944

WITNESS
E. B. Bjurstrom

INVENTOR.
HENRY E. KORUM
ATTORNEYS

Patented July 1, 1947

2,423,192

UNITED STATES PATENT OFFICE 2,423,192

FEED HOPPER

Henry E. Korum, East Moline, Ill., assignor to Deere & Company, Moline, Ill., a corporation of Illinois Application September 14, 1944, Serial No. 554,087

9 Claims. (Cl. 222—459)

The present invention relates generally to feed hoppers and more particularly to hoppers for feeding kernels of grain into a mill of the type which prepares the grain for feed for livestock, such as hammer mills or the like. The principal object of the invention relates to the provision of a novel and improved means for controlling the flow of grain from the hopper into the mill.

Hoppers of this type are provided with an inclined floor or bottom which slopes downwardly toward a feed opening at one end of the hopper, the slope of the floor being sufficient to cause the grain to flow through the opening to the mill. A vertically shiftable gate governs the size of the opening and hence controls the rate of feed of the kernels from the hopper. Heretofore, feed hoppers of this type have required some attention to maintain a constant flow of kernels through the comparatively small opening, due to the tendency of the kernels to wedge together and become lodged at the opening.

It is an object of my invention to provide means for so controlling the flow of grain that this difficulty is eliminated. In the accomplishment of this object I have provided a baffle plate in the hopper spaced from the gate for the purpose of retarding the flow of grain to prevent the pressure of the mass of kernels in the hopper from acting directly against the kernels passing through the opening. With this pressure removed, the tendency for the kernels to jam or lodge in the opening is substantially eliminated.

Figure 1:
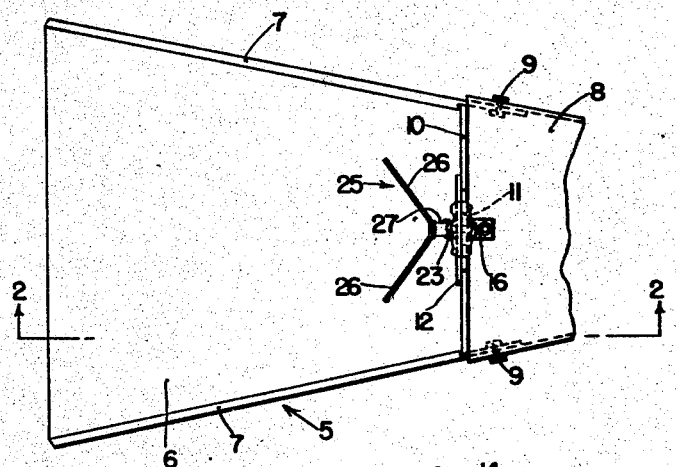
Figure 2:
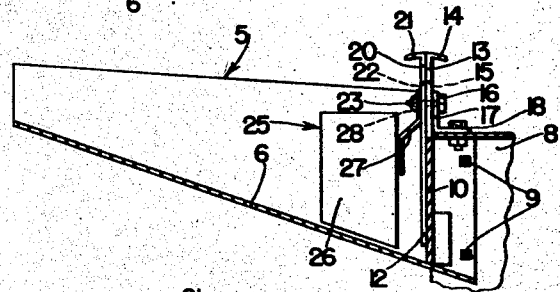
Figure 3:
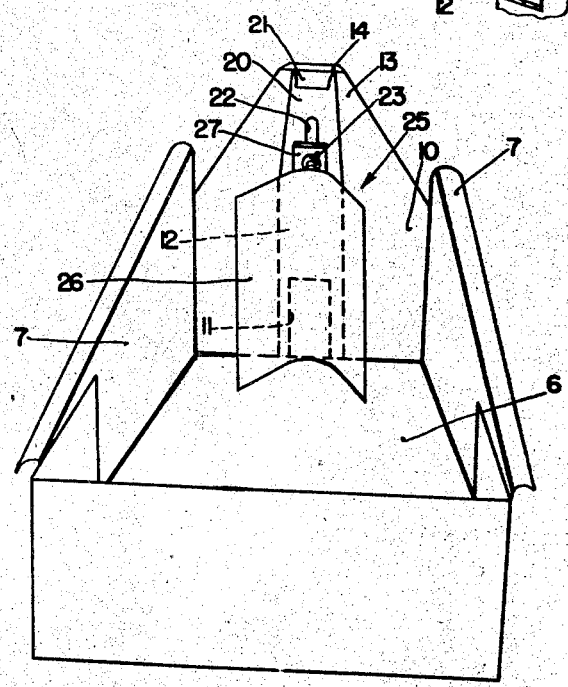

These and other objects and advantages of my invention will be apparent to those skilled in the art after a consideration of the following description in which reference is made to the drawings appended hereto, in which Figure 1 is a plan view of a hopper having feeding control means embodying the principles of my invention;

Figure 2 is an elevational view taken in section along a line 2—2 in Figure 1; and Figure 3 is a perspective view of the hopper.

Referring now to the drawings, the hopper 5 comprises a floor plate 6 and a pair of converging side walls 7 which extend into the intake passage 8 of a feed mill and are rigidly secured thereto by bolts 9. The floor plate 6 inclines downwardly toward the intake passage 8 at an angle sufficient to cause grain to flow by gravity toward the passage 8.

The inner end of the hopper at the intake passage 8 is closed by an end wall in the form of a vertically slidable plate 10, which is provided with a small aperture 11 in the center of the bottom edge. This aperture is closed by a gate 12, which lies flat against the plate 10 inside the hopper and is shiftable vertically relative thereto to open and close the aperture 11. The plate 10 is provided with an upper supporting portion 13, the top of which is bent over to serve as a handle 14. A vertical slot 15 in the upper portion 13 receives a securing bolt 16, which is mounted on an angular bracket 17 fixed to the top of the mill intake passage 8 by a bolt 18.

Likewise, the gate 12 has an upper supporting portion 20, the top edge of which is turned to form a handle 21. The upper portion is slotted vertically at 22 to receive the bolt 16. A wing nut 23 on the threaded end of the bolt 16 serves to clamp the gate 12 and plate 10 to the bracket 17 in vertically adjusted position.

When feeding hay, cornstalks, etc., to the mill, the plate 10 and gate 12 are removed to make available the entire intake passage, but when grinding ears of corn, the plate and gate are secured by the bolt 16 in partly raised position to provide an opening therebeneath sufficient to allow ears to pass. However, when kernels of corn and other grains are in the hopper, the plate 10 is shifted downwardly to the floor 6 while the gate 12 is held in raised position to uncover the grain opening 11 in the gate 10.

In order to prevent the grain from packing or lodging in the opening 11, a baffle plate 25 is provided in the hopper 5 spaced in front of the opening 11. The baffle is in the form of a plate bent into a V-shape with the apex upright in front of the opening and the laterally opposite side portions 26 inclined inwardly of the hopper at opposite sides of the opening 11, respectively, for retarding the flow of grain toward the opening. The baffle blocks the flow of grain directly into the opening from the main body of grain in the hopper, but the side portions 26 terminate in spaced relation to the side walls 7 of the hopper, thereby permitting grain to flow around the side portions toward the opening 11.

The baffle 25 is fixed, as by welding, to a strap or bracket 27, which is inclined upwardly toward the gate, the upper portion of the bracket lying flat against the gate and having a vertical slot 28 adapted to receive the bolt 16. When the baffle is in use, the wing nut 23 clamps the bracket 27 and the upper portions 20, 13 of the gate and plate firmly together and to the supporting bracket 17. When a faster rate of feed of grain to the opening 11 is desired, the wing nut 23 is loosened to permit the gate 12 and the baffle 25 to be adjusted upwardly, either independently or simultaneously.

I claim:

1. In a feed hopper of the type including an end wall having a feed opening for feeding kernels of grain into a hammer mill or the like, a generally vertical baffle plate disposed in front of said feed opening in said hopper and having bracket means for supporting said plate, said plate having laterally opposite side portions inclined inwardly of said hopper away from said opening for retarding the flow of grain to prevent it from becoming lodged in said opening.

2. In a feed hopper of the type including an end wall having a feed opening for feeding kernels of grain into a hammer mill or the like, a generally V-shaped baffle plate mounted on said hopper with its apex upright in front of said feed opening, said plate having laterally opposite side portions inclined inwardly of said hopper away from said opening for retarding the flow of grain to prevent it from becoming lodged in said opening.

3. In a feed hopper of the type including an end wall having a feed opening for feeding kernels of grain into a hammer mill or the like, a generally vertical baffle plate disposed in front of said feed opening in said hopper, bracket supporting means for said plate, means for mounting said bracket means on said end wall providing for vertical adjustment of said plate relative to said hopper, said plate having laterally opposite side portions inclined inwardly of said hopper away from said opening for retarding the flow of grain to prevent it from becoming lodged in said opening.

4. In a feed hopper of the type including an end wall having a feed opening for feeding kernels of grain into a hammer mill or the like, a vertically shiftable gate for controlling the flow of grain from said hopper through said opening, a generally vertical baffle plate disposed in said hopper and spaced inwardly from said gate, a pair of vertically slotted supporting brackets for said gate and said plate, respectively, and a support therefor including an adjustable bolt adapted to receive said slotted brackets, said plate acting to retard the flow of grain to prevent it from becoming lodged in said opening.

5. In a feed hopper of the type including an end wall having a feed opening for feeding kernels of grain into a hammer mill or the like, a vertically shiftable gate for controlling the flow of grain from said hopper through said opening, a generally V-shaped baffle plate disposed in said hopper with its apex upright and spaced inwardly from said gate, a pair of vertically slotted supporting brackets for said gate and said plate, respectively, and a support therefor including an adjustable bolt adapted to receive said slotted brackets, said plate having laterally opposite side portions inclined inwardly of said hopper away from said opening for retarding the flow of grain to prevent it from becoming lodged in said opening.

6. In a feed hopper including bottom and side walls, one of said walls having an opening for releasing flowable material from the hopper, a generally V-shaped baffle fixedly disposed in said hopper adjacent said opening to block the flow of the main body of material directly into said opening but spaced from the latter to permit flow of material from each side into the opening, said baffle having laterally opposite side portions inclined inwardly of said hopper away from said opening and terminating in spaced relation to the side walls of said hopper to permit material to flow around the side portions of said baffle toward said opening.

7. In a feed hopper including side walls and an inclined bottom wall, one of said side walls having an opening near the bottom for releasing flowable material from the hopper, a generally V-shaped baffle plate fixedly disposed in said hopper with its apex upright in front of said opening to block the flow of material directly into said opening but spaced from the latter to permit flow of material from laterally opposite sides of the opening through the latter, said baffle having laterally opposite side portions inclined inwardly of said hopper away from said opening and terminating in spaced relation to the side walls of said hopper to permit material to flow around the side portions of said baffle toward said opening.

8. In a feed hopper of the type including an end wall having a feed opening for feeding kernels of grain into a hammer mill or the like, a generally vertical baffle plate disposed in front of said feed opening in said hopper for blocking flow from the main body of grain in the hopper directly into the opening but spaced therefrom to permit grain to flow from each side into said opening and having bracket means for supporting said plate, said plate having laterally opposite side portions inclined inwardly of said hopper away from said opening for retarding the flow of grain to prevent it from becoming lodged in said opening, said side portions terminating in spaced relation to the sides of said hopper to permit flow of grain around the ends of said side portions.

9. In a feed hopper of the type including an end wall having a feed opening for feeding kernels of grain into a hammer mill or the like, a generally vertical baffle plate disposed in front of said feed opening in said hopper for blocking flow from the main body of grain in the hopper directly into the opening but spaced therefrom to permit grain to flow from each side into said opening, bracket supporting means for said plate, means for mounting said bracket means on said end wall providing for vertical adjustment of said plate relative to said hopper, said plate having laterally opposite side portions inclined inwardly of said hopper away from said opening for retarding the flow of grain to prevent it from becoming lodged in said opening but terminating in spaced relation to the sides of said hopper to permit flow of grain around the ends of said side portions.

HENRY E. KORUM.

REFERENCES CITED

The following references are of record in the file of this patent:

UNITED STATES PATENTS

| Number | Name | Date |
| --- | --- | --- |
| 2,123,318 | Taylor | July 12, 1938 |